(12) United States Patent
Nagahori et al.

(10) Patent No.: US 6,492,617 B2
(45) Date of Patent: Dec. 10, 2002

(54) PIERCING DEVICE FOR LASER CUTTER

(75) Inventors: Masayuki Nagahori, Iruma-gun (JP); Shinji Numata, Iruma-gun (JP); Masato Kawakita, Iruma-gun (JP)

(73) Assignee: Tanaka Engineering Works, Ltd., Saitama-ken (JP)

( * ) Notice: Subject to any disclaimer, the term of this patent is extended or adjusted under 35 U.S.C. 154(b) by 0 days.

(21) Appl. No.: 09/829,647

(22) Filed: Apr. 10, 2001

(65) Prior Publication Data

US 2001/0029365 A1 Oct. 11, 2001

(30) Foreign Application Priority Data

Apr. 10, 2000 (JP) .......................... 2000-108569

(51) Int. Cl.⁷ .............................. B23K 26/14
(52) U.S. Cl. .................. 219/121.84; 219/121.7
(58) Field of Search ................ 219/121.84, 121.67, 219/121.7

(56) References Cited

U.S. PATENT DOCUMENTS

| | | | |
|---|---|---|---|
| 4,942,284 A | * | 7/1990 | Etcheparre et al. .... 219/121.84 |
| 5,981,901 A | | 11/1999 | La Rocca |
| 6,204,475 B1 | * | 3/2001 | Nakata et al. ......... 219/121.84 |

FOREIGN PATENT DOCUMENTS

| | | |
|---|---|---|
| EP | 0 618 037 A1 | 10/1994 |
| EP | 1 005 945 A2 | 6/2000 |
| JP | 5-131288 | 5/1993 |
| JP | 5-200571 A * | 8/1993 |
| JP | 8-318388 A * | 12/1996 |
| JP | 10-225787 | 8/1998 |
| WO | WO 93/16838 | 9/1993 |

* cited by examiner

*Primary Examiner*—Geoffrey S. Evans
(74) *Attorney, Agent, or Firm*—Scully, Scott, Murphy & Presser

(57) ABSTRACT

The present invention stably supplies a side blow gas to a piercing site and prevents the adherence of spatter to a cutting nozzle. A hood, which is attached to a side blow gas nozzle, guides side blow gas jetted from a side blow gas nozzle to the piercing site and prevents spatter from adhering to the cutting nozzle as laser beam and assist gas are respectively radiated or jetted onto a cutting material through a communicating hole.

3 Claims, 5 Drawing Sheets

PIERCING DEVICE FOR LASER CUTTER

BACKGROUND OF THE INVENTION

1. Field of the Invention

The present invention relates to a laser cutter, and more specifically to a piercing device for a laser cutter that is highly efficient at carrying out the piercing operation performed to initiate a cutting operation.

2. Description of the Related Art

When employing a laser to cut a thick (6 mm or more) steel sheet, for example, it is the typical practice to perform a piercing operation first, followed by the intended cutting operation.

In general, as shown in FIG. 7, the piercing operation consists of irradiating a material 3 to be cut, such as a steel plate or the like, with a laser beam 2 from a cutting nozzle 1; supplying an assist gas 4 along the same axis as the laser beam 2, to heat and melt cutting material 3; and expelling molten metal 6 using the kinetic energy of assist gas 4 from a pierced hole 5 which is formed in the cutting material 3. When carrying out the piercing operation, a portion of the molten metal 6 accumulates around the periphery of the pierced hole 5 while another portion spatters onto sites away from the pierced hole 5.

Oxygen is typically used as assist gas 4. When the piercing operation is carried out using oxygen gas, high energy is produced due to oxidation of the steel plate material by the oxygen gas. Accordingly, this is advantageous to carrying out the piercing operation efficiently. A pulse oscillation of 100 Hz or less is typical as the radiating conditions for the laser beam 2 during piercing. However, by placing the laser in a continuous oscillation state, output of the laser beam 2 can be increased, enabling the formation of the desired pierced hole 5 in a shorter period of time. Thus, the time for performing the piercing operation can be reduced.

Various problems arise when the output of the laser beam 2 is increased, however. Namely:

a) The diameter of the pierced hole 5 increases
b) Bubbling of the molten metal 6 becomes excessive
c) Damage may be caused to the cutting nozzle 1 or the condensing lens due to b)
d) Spattered material adhering to the cutting material 3 increases
e) Poor cutting occurs when initiating the cutting operation due to d)

In light of these problems, attempts have been made in recent years to carry out the piercing operation at high speed by increasing the peak output of the laser beam pulse. However, since such problems as adherence of spattering to the lens or nozzle occurs, this has not fundamentally resolved the problem.

Attempts have also been made to prevent bubbling of the molten metal and adherence of spattering by controlling the output of the laser beam during the piercing operation. However, since the piercing speed is contingent upon the control speed, the improvement in speed has been limited.

The present inventors accordingly developed the laser cutter shown in FIGS. 8 through 10 (Japanese Patent Application, Hei 9-29380).

This laser cutter has a side blow gas nozzle 10 provided at the side of a cutting nozzle 1. The side blow gas nozzle 10 is a separate member from the cutting nozzle 1 and is held by a moving means 11 at the side of the cutting nozzle 1. The side blow gas nozzle 10 jets a side blow gas (side assist gas) 12 at the piercing site (i.e., the site where the pierced hole 5 is to be formed). Accordingly, the jetting of side blow gas 12 jetted by the side blow gas nozzle 10 is slanted toward the optical axis of the laser beam 2. The laser beam 2 radiates the cutting material 3 by traveling through a laser beam hole 7 which passes through the cutting nozzle 1. Thus, the jetting of side blow gas 12 is inclined with respect to the assist gas 4 which is being jetted from the laser beam hole 7. The moving means 11 has the structure as shown in FIGS. 9 and 10, and is for moving the side blow gas nozzle 10, which it holds, closer to or further away from the piercing site.

In FIG. 9, the moving means 11 is a rotational driving member 13 that is attached above cutting nozzle 1 (i.e., at the upper part of FIG. 9). Using the driving force of an electric motor for example, the moving means 11 supports the side blow gas 12 supply inlet side of the side blow gas nozzle 10 in a manner so as to be freely rotating about an axial line perpendicular to the optical axis of laser beam 2. The rotational driving member 13 moves an end 14 of the side blow gas nozzle 10 near an end 15 of the cutting nozzle 1 during piercing, and rotates the side blow gas nozzle 10 during the cutting operation to move it away from the end 15 of the cutting nozzle 1.

In FIG. 10, the moving means 11 is an elevational driving member 16 that is attached above the cutting nozzle 1 (at the upper part of FIG. 10). Using the driving force of an electric motor for example, the moving means 11 supports the side blow gas 12 supply inlet side of side blow gas nozzle 10 in a manner so as to be freely elevating along the optical axis of the laser beam 2. The elevational driving member 16 moves an end 14 of the side blow gas nozzle 10 near an end 15 of the cutting nozzle 1 during piercing, and elevates the side blow gas nozzle 10 during the cutting operation to move it away from the end 15 of the cutting nozzle 1.

The numeric symbol 17 in FIG. 8 indicates a side blow gas control mechanism. This side blow gas control mechanism 17 is provided with a pressure sensor 18 for measuring the supply pressure of assist gas 4 to the laser beam hole 7; a level converting mechanism 19 that changes and sets the supply pressure of the side blow gas 12 in response to the measured pressure at the pressure sensor 18; and a pressure adjusting mechanism 20 for adjusting the supply pressure of the side blow gas based on the pressure set by the level converting mechanism 19. The pressure sensor 18 is attached to the cutting nozzle 1 and measures the pressure of the assist gas 4 inside the laser beam hole 7.

In other words, at the side blow gas control mechanism 17, when the measurement signal for pressure P1 of the assist gas 4, which is measured by the pressure sensor 18, is input to the level converting mechanism 19, the level converting mechanism 19 calculates a suitable supply pressure P2 for the side blow gas 12 according to this pressure P1, and sends a directive signal to pressure adjusting mechanism 20. As a result, the pressure adjusting mechanism 20 adjusts the supply pressure of the side blow gas 12 to the pressure P2.

The flow rate of the side blow gas 12 which is jetted from the side blow gas nozzle 10 must be adjusted to be within limits that do not impair the supply of the assist gas 4 to the piercing site, and which can promote formation of the pierced hole 5 by ensuring sufficient kinetic energy is imparted to the side blow gas 12. This flow rate is determined based on the supply pressure P2 of the side blow gas 12 with respect to the cross-sectional area of the gas flow path at the end of the side blow gas nozzle 10 from which the gas is jetted.

This laser cutting device performs the intended cutting operation on the cutting material 3 by moving the cutting nozzle 1 in three-dimensional directions using a driving mechanism not shown in the figures. The side blow gas nozzle 10 is also moved accompanying the cutting nozzle 1 at this time, and is typically disposed near the cutting nozzle 1.

When cutting a thick plate using this laser cutting mechanism, the pierced hole 5 is first formed during the piercing operation, after which the process proceeds to the intended cutting operation. In the piercing operation, the side blow gas nozzle 10 is moved to the piercing site by the moving means 11 and maintained there. The assist gas 4 is jetted from the cutting nozzle 1 and the side blow gas 12 is jetted from the side blow gas nozzle 10 so that molten metal is removed as the pierced hole 5 is being formed by irradiating the cutting material 3 with the laser beam 2. When the desired pierced hole 5 is formed, the jetting of the side blow gas 12 from the side blow gas nozzle 10 is stopped, and the side blow gas nozzle 10 is withdrawn from the piercing site. At the same time, jetting of the assist gas 4 from the cutting nozzle 1 is continued and the intended cutting operation using the laser beam 2 is initiated.

In the piercing operation, as the molten metal 6 and spattering is generated, they are gradually blown away from the piercing site because the flow rate of the side blow gas 12 is two-fold or more greater than that of the assist gas 4. Thus, the molten metal 6 and spattering does not adhere to the cutting material 3 or the cutting nozzle 1. In other words, in the piercing operation, the pierced hole 5 is formed as the molten metal 6 and spattering are simultaneously being removed from the cutting material 3 when the molten metal 6 and spattering is generated. Accordingly, the molten metal 6 does not adhere around the pierced hole 5, so that the intended pierced hole 5 can be obtained. Since the adherence of the molten metal 6 and spatter to the cutting material 3, the side blow gas nozzle 10, and the condensing lens incorporated in cutting nozzle 1 are also prevented, there is no concern that poor cutting will occur during the intended cutting operation. Thus, the quality of the cut product is improved.

Thus, in this novel laser cutter, the adherence of molten metal or spatter on the cutting nozzle and the cutting material is prevented, so that piercing can be carried out quickly.

However, the side blow gas may not be stably supplied to the piercing site. For this reason, it is difficult to pierce a steel plate having a thickness of 20 mm or more in which a large amount of spattering occurs during piercing. When the piercing of a 20 mm or thicker steel plate is performed, a large amount of spattering occurs which adheres to the cutting nozzle and the lens. As a result, the cutting operation following piercing cannot be carried out.

SUMMARY OF THE INVENTION

The present invention was conceived to resolve the above-described circumstances, and has as its objective the provision of a piercing device for a laser cutter which is capable of stably supplying a side blow gas to a piercing site.

Another objective of the present invention is to provide a piercing device for a laser cutter that can perform piercing of a cutting material such as a thick steel plate while strongly limiting spatter adherence.

In order to achieve at least one of the above objectives, the invention according to the present invention is designed such that a laser cutter is provided with a cutting nozzle, in which there is formed a laser beam hole through which the laser beam for radiating the cutting material passes, this cutting nozzle blowing an assist gas sent through this laser beam hole toward the cutting material on the same axis as the laser beam; and a side blow gas nozzle for blowing a separate side blow gas from the side of the laser beam hole toward the laser beam's radiating site on the cutting material, at an incline with respect to the cutting material's surface; wherein a hood having a communicating hole which transmits the laser beam and the assist gas is provided in between the cutting nozzle and the side blow gas nozzle.

In this means, the laser beam and the assist gas pass through the hood's communicating hole and, respectively, radiate or are jetted onto the cutting material, thereby piercing it.

In this case, the hood guides the side blow gas jetted from the side blow gas nozzle to the piercing site, and prevents the adherence of molten metal and spatter to the cutting nozzle.

Highly pure oxygen, air, nitrogen or various other inert gases may be used for the assist gas and the side blow gas. The assist gas and the side blow gas may be the same or different. It is desirable that the angle of inclination of the side blow gas nozzle with respect to the surface of the cutting material be 45° or less.

It is preferable to attach the hood to the side blow gas nozzle.

In this design, the hood moves together with the side blow gas nozzle, improving operability.

In the above piercing device for the laser cutter, it is desirable to provide a guide projecting toward the cutting material on either side of the hood along the direction of flow of the side blow gas.

In this design, the hood guide correctly guides the side blow gas to the piercing site by preventing the side blow gas jetted from the side blow gas nozzle from escaping in the horizontal direction.

DESCRIPTION OF THE PREFERRED EMBODIMENTS

Preferred embodiments of the present invention will now be explained with reference to the accompanying figures.

Figure 1:
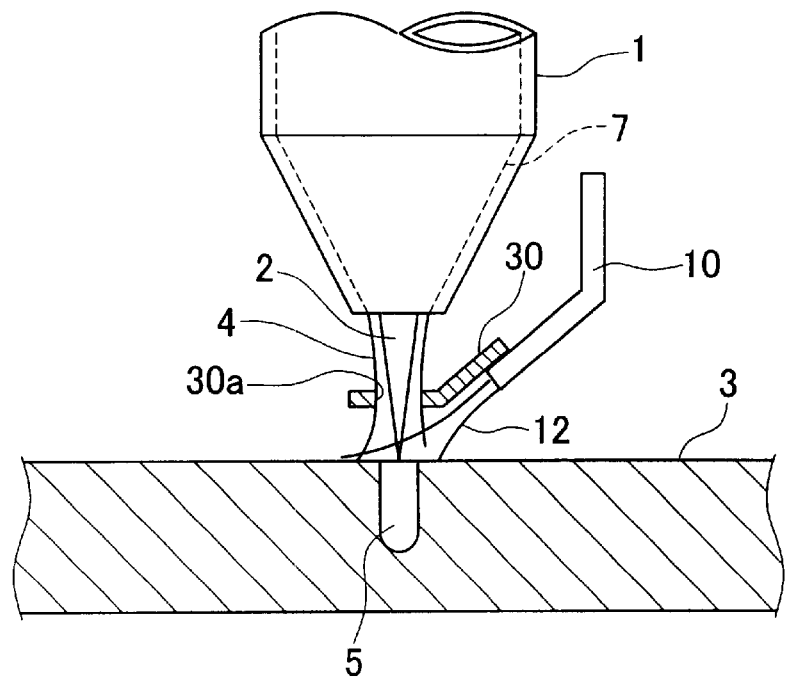
FIG. 1 is a cross-sectional view showing an embodiment of the present invention's piercing device for a laser cutter.
Figure 2:
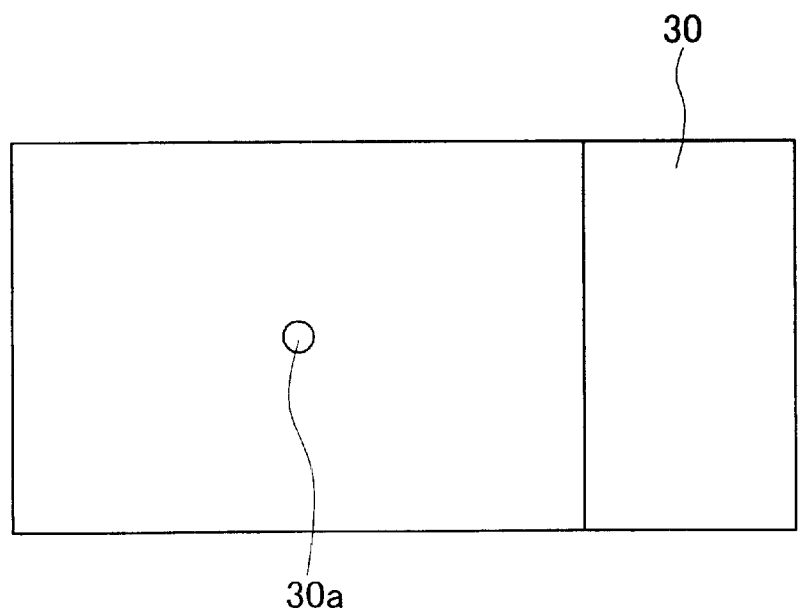
FIG. 2 is a planar view of the hood in FIG. 1.
Figure 3:
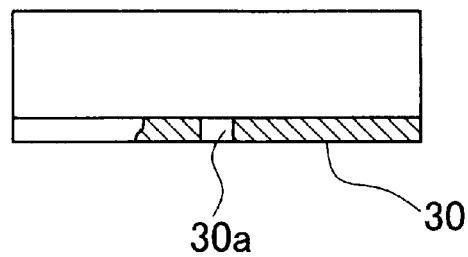
FIG. 3 is a front view in cross-section of a part of the hood in FIG. 1.

FIGS. 1 through 3 show embodiments of a piercing device for a laser cutter according to the present invention. As the basic structure of the laser cutter is identical to the conventional laser cutter shown in FIGS. 7 through 10, the same symbols will be applied to equivalent parts and explanations thereof will be omitted.

The numeric symbol 30 in FIGS. 1 through 3 indicates a hood. The hood 30 is formed of Cu or Al, which have good heat conduction. The hood 30 is positioned between the cutting nozzle 1 and the side blow gas nozzle 10, and is attached to the side blow gas nozzle 10 in a freely releasable manner by means of an attaching means (not shown), such as a machine screw, so that its circular communicating hole 30a is positioned directly under the cutting nozzle 1.

As the laser beam 2 and the assist gas 4 are respectively radiated or jetted onto the cutting material 3 through the communicating hole 30a, the hood 30 is designed to guide the side blow gas 12 jetted from the side blow gas nozzle 10 to the piercing site, and to prevent the molten metal or spatter generated during piercing from adhering to the cutting nozzle 1 by serving as a shield between the cutting nozzle 1 and the cutting material 3.

A larger diameter for the communicating hole 30a is better for having good radiation of the laser beam 2 or jetting of assist gas 4 onto the cutting material 3. On the other hand, a smaller diameter is better for increasing the shielding effect of the hood 30. Therefore, taking these factors into consideration comprehensively, the diameter of the communicating hole 30a is typically 2 mm or less.

In a piercing device for a laser cutter of the above-described design, the hood 30 guides side blow gas jetted from the side blow gas nozzle 10 to the piercing site so that the side blow gas works more effectively to remove the molten metal and spatter from the pierced hole 5. As a result, it is possible to pierce even a thick steel plate without trouble.

Further, since the hood 30 shields the cutting nozzle 1 from the piercing site, it is possible to even better prevent the molten metal and spatter from adhering to the cutting nozzle 1 or the condensing lens, so that piercing can always be carried out in an ideal state.

Furthermore, since the hood 30 is attached to the side blow gas nozzle 10, workability and handling are improved.

Figure 4:
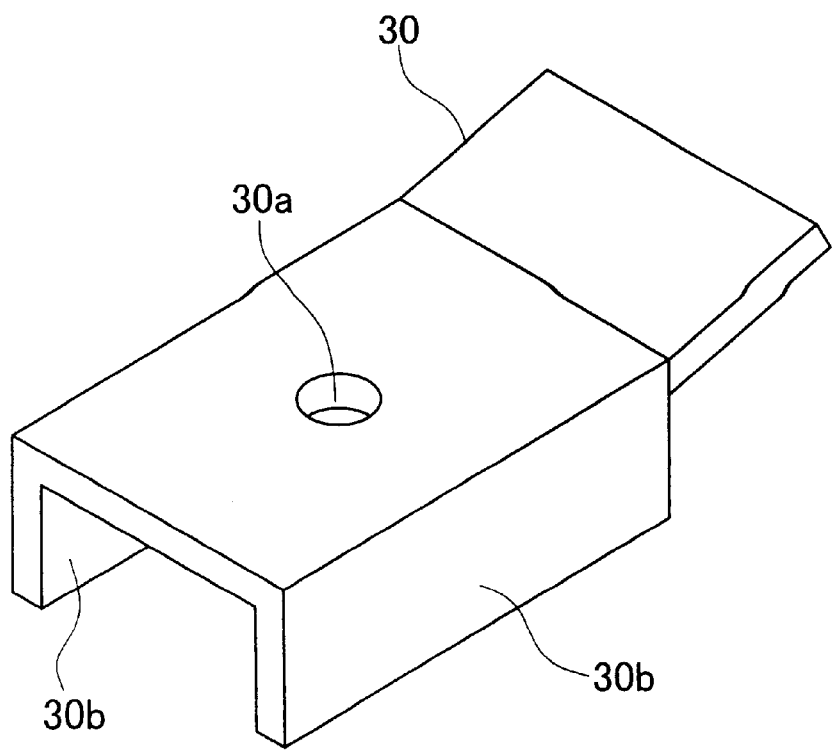
FIG. 4 is a perspective view of another embodiment of the hood.
Figure 5:
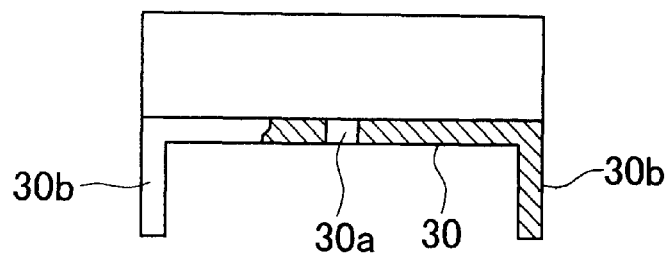
FIG. 5 is a front view in cross-section of a part of the hood in FIG. 4.

FIGS. 4 and 5 show another embodiment of the hood 30. In the case of this hood 30, guides 30b,30b are provided to both sides of the hood 30 along the direction of the side blow gas 12 (FIG. 1) flow (in the left-right direction in FIG. 1 and in a direction perpendicular to the paper in FIG. 5), in order to project toward the cutting material side thereof. In other words, these guides 30b,30b are provided projecting downward from the hood 30.

In the hood 30 of FIGS. 4 and 5, the side blow gas jetted from the side blow gas nozzle is prevented from dispersing to the left or right by the guides 30b,30b and is supplied with even greater accuracy to the piercing site. Accordingly, side blow gas works even more effectively, enabling piercing of a thick cutting material by removing the molten metal and spatter from the pierced hole.

The guide 30b reinforces resistance of the hood 30 to deformation. In addition, it is also possible to form the guide 30b without bending as shown in the figures, by means of a separate member attachment.

Figure 6:
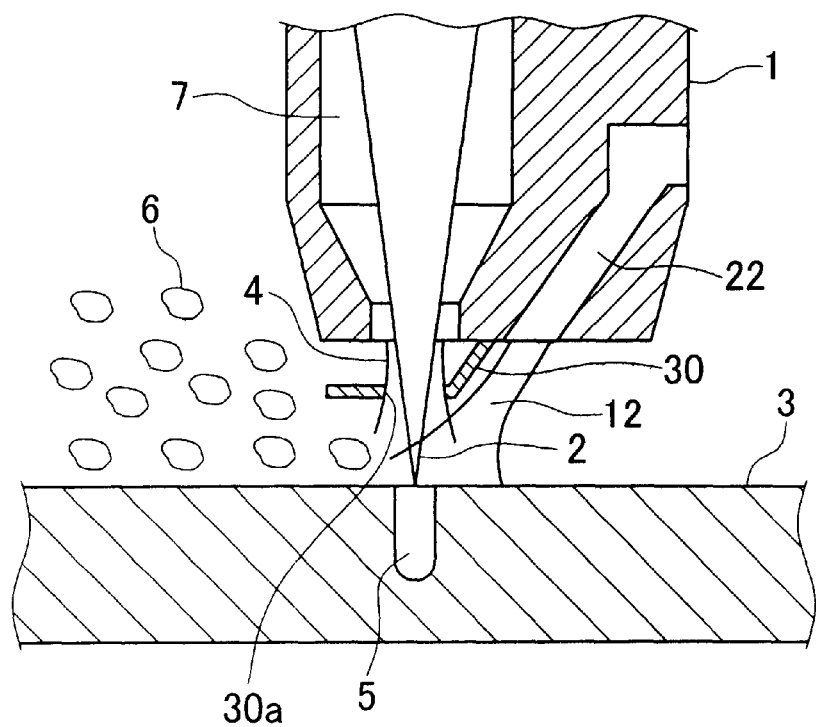
FIG. 6 is a cross-sectional view showing another embodiment of the present invention's piercing device for a laser cutter.
Figure 7:
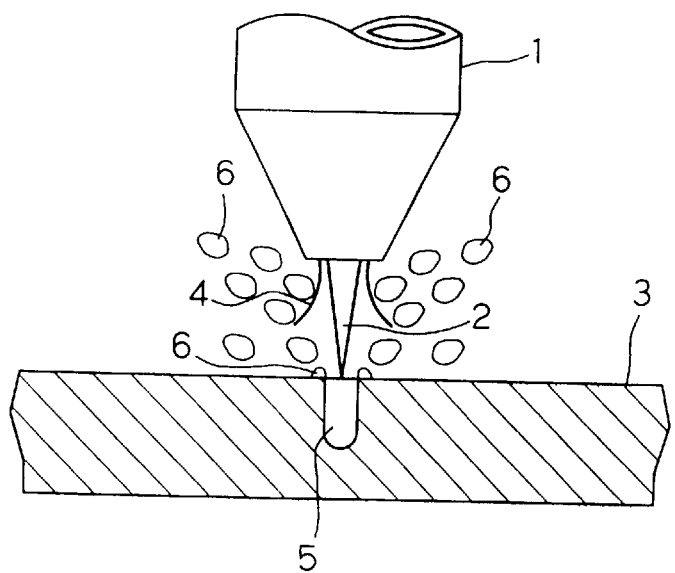
FIG. 7 shows the main parts of a conventional laser cutter.
Figure 8:
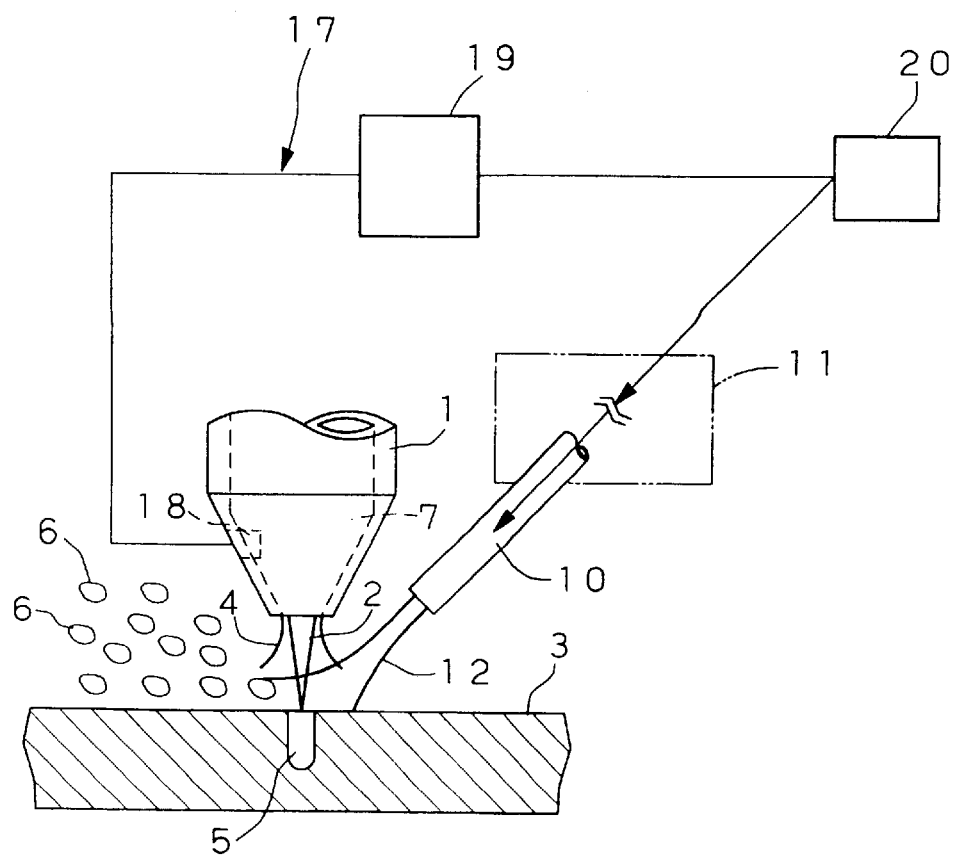
FIG. 8 shows another conventional laser cutter.
Figure 9:
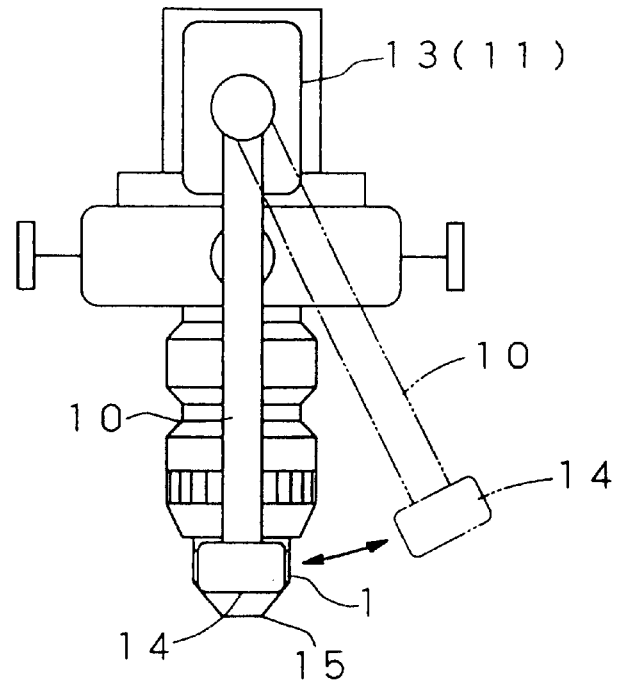
FIG. 9 is a view showing the moving means in FIG. 8.
Figure 10:
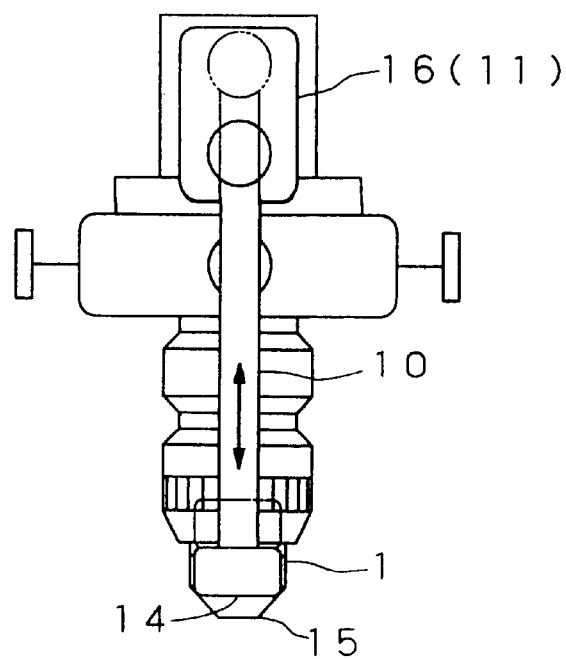
FIG. 10 is a view showing another embodiment of the moving means.

FIG. 6 shows another embodiment of the piercing device for a laser cutter according to this invention. In this piercing device for a laser cutter, a side blow gas hole (side blow gas nozzle) 22 is provided with the cutting nozzle 1 in addition to its laser beam hole 7. The hood 30 is provided at the lower surface of cutting nozzle 1 and serves as a shield between the laser beam hole 7, the cutting material 3 and the side blow gas hole 22.

Effects equivalent to those achieved with the piercing device shown in FIG. 1 may be anticipated with this piercing device as well. It is of course also possible to employ the hood 30 shown in FIGS. 4 and 5. In any case, the hood 30 may be attached to the cutting nozzle 1, or may be attached to another attachment member. Other designs are equivalent to the piercing device for a laser cutter shown in FIG. 1.

The constitution and structure of the side blow gas nozzles 10,22 and hood 30 in the present invention are not limited to those shown in the figures. For example, various design modifications, such as ensuring the flow of the assist gas 4 to the communicating hole 30a by providing a funnel shaped cylinder above the communicating hole 30a, are also possible.

What is claimed is:

1. A piercing device for a laser cutter, said laser cutter provided with a cutting nozzle, in which there is formed a laser beam hole through which the laser beam for irradiating the cutting material passes, this cutting nozzle blowing an assist gas sent on the same axis as the laser beam through said laser beam hole toward the cutting material; and a side blow gas nozzle for blowing a separate side blow gas from the side of the laser beam hole toward the laser beam's radiating site on the cutting material, at an incline with respect to the cutting material's surface; wherein:

a hood having a communicating hole which transmits said laser beam and said assist gas is attached only to said side blow gas nozzle so as to be provided between said cutting nozzle and said side blow gas nozzle.

2. A piercing device for a laser cutter according to claim 1, wherein guides are provided to both sides of said hood projecting toward the cutting material and traveling along the flow direction of the side blow gas.

3. A piercing device for a laser cutter according to claim 1, wherein said communicating hole has a diameter of up to a maximum of 2 mm.

* * * * *